United States Patent
Costa

(10) Patent No.: US 11,618,523 B2
(45) Date of Patent: Apr. 4, 2023

(54) MOTORCYCLE FORK ADAPTER

(71) Applicant: Vince Costa, Anaheim, CA (US)

(72) Inventor: Vince Costa, Anaheim, CA (US)

( * ) Notice: Subject to any disclaimer, the term of this patent is extended or adjusted under 35 U.S.C. 154(b) by 0 days.

(21) Appl. No.: 17/534,863

(22) Filed: Nov. 24, 2021

(65) Prior Publication Data
US 2022/0185419 A1    Jun. 16, 2022

Related U.S. Application Data

(60) Provisional application No. 63/124,485, filed on Dec. 11, 2020.

(51) Int. Cl.
*B62K 21/04* (2006.01)
*B62K 19/32* (2006.01)
*B62K 21/06* (2006.01)

(52) U.S. Cl.
CPC .............. *B62K 21/04* (2013.01); *B62K 19/32* (2013.01); *B62K 21/06* (2013.01)

(58) Field of Classification Search
CPC ......... B62K 21/04; B62K 19/32; B62K 21/06
See application file for complete search history.

(56) References Cited

U.S. PATENT DOCUMENTS

| 3,866,946 A | 2/1975 | Robison | |
| 5,967,538 A * | 10/1999 | Callaluca | B62K 21/04 180/219 |
| 7,438,306 B2 * | 10/2008 | Mrdeza | B62K 21/04 280/274 |
| 9,079,631 B1 | 7/2015 | Costa | |
| 10,549,808 B2 * | 2/2020 | Thompson | B62K 19/32 |

* cited by examiner

*Primary Examiner* — Amy R Weisberg
*Assistant Examiner* — Hosam Shabara
(74) *Attorney, Agent, or Firm* — Clement Cheng

(57) ABSTRACT

A motorcycle fork has an upper tree; a lower tree; a steering neck; and a steering stem. The steering stem is connected to the upper tree at a steering stem upper end, and is connected to the lower tree at a steering stem a lower end, and passes through the steering neck. The steering stem is oriented to a steering neck centerline in a first mode. A neck upper bearing race seat is formed on an upper portion of the steering neck. A neck lower bearing race seat is formed on a lower portion of the steering neck. An upper bearing race receives an upper bearing. The upper bearing race is mounted in the neck upper bearing race seat in the first mode. A lower bearing race receives a lower bearing. The lower bearing race is mounted in the neck lower bearing race seat in the first mode.

18 Claims, 10 Drawing Sheets

MOTORCYCLE FORK ADAPTER

The present application claims priority from U.S. provisional 63/124,485 filed Dec. 11, 2020, entitled Motorcycle Rake Adapter by same inventor Vince Costa, the disclosure of which is incorporated herein by reference.

FIELD OF THE INVENTION

The present invention is in the field of motorcycle fork adapters.

DISCUSSION OF RELATED ART

A motorcycle controls the front wheel via a pair of fork legs. The fork legs are attached and held in place with a pair of triple trees, an upper tree and a lower tree. These triple trees are then connected by a steering stem. The steering stem is rotatably connected to the steering neck of the motorcycle via a pair of bearings. Typically, these bearings are of the tapered roller variety. The steering neck is tilted at a steering angle relative to the vehicle. Typically, this is the rake angle which determines the handling characteristics of the motorcycle. Small changes to the rake angle make large changes to the vehicle dynamics, Many production motorcycles have flats on the steering neck. These flats can be external or in some cases internal. These flats were intended either as provision steering stops, or for removing bearing races, or possibly as byproducts of the manufacturing process.

Most motorcycles use similar steering systems having a steering stem that ride on bearings held in a steering neck. Typically, alteration of motorcycle rake involve either utilizing an attachment that creates a new steering neck, such as shown in U.S. Pat. No. 7,438,306 entitled Motorcycle Rake And Trail Adjuster issued Oct. 21, 2008 by inventor Matthew Mrdeza and in U.S. Pat. No. 9,079,631 entitled Motorcycle Fork Adapter issued Jul. 14, 2015 by inventor Vince Costa who is also the inventor of this application.

A traditional method of adjusting a motorcycle rake requires building the frame of the vehicle with a special neck that provides ease of adjustment during manufacturing, such as shown in U.S. Pat. No. 3,866,946 entitled Motorcycle Steering Head Angle Adjustment issued Feb. 18, 1975 to inventor Gary A. Robison. However, U.S. Pat. No. 3,866, 946 deals with providing an adjustment means for factory use rather than an end user retrofit stating in its summary of the invention, "The invention also contributes to vehicle safety in that, since the motorcycle is provided with means for adjustment of the steering head angle, there is no temptation for the owner to modify the motorcycle to achieve a desired value." The disclosures of the above cited patents are incorporated herein by reference.

SUMMARY OF THE INVENTION

A motorcycle fork has an upper tree; a lower tree; a steering neck; and a steering stem. The steering stem is connected to the upper tree at a steering stem upper end, and is connected to the lower tree at a steering stem a lower end, and passes through the steering neck. The steering stem is oriented to a steering neck centerline in a first mode. A neck upper bearing race seat is formed on an upper portion of the steering neck. A neck lower bearing race seat is formed on a lower portion of the steering neck. An upper bearing race receives an upper bearing. The upper bearing race is mounted in the neck upper bearing race seat in the first mode. A lower bearing race receives a lower bearing. The lower bearing race is mounted in the neck lower bearing race seat in the first mode.

The upper bearing cup is mounted in the neck upper bearing race seat in a second mode. The upper bearing is mounted to the bearing cup in the second mode. The lower bearing cup is mounted in the neck lower bearing race seat in a second mode. The steering stem has a steering stem centerline offset in a second mode that is at an offset angle from the steering neck centerline of the first mode. An upper bearing cup internal tab extends downwardly from the upper bearing cup. The upper bearing cup internal tab is configured to engage a neck upper internal indent formed on an inside surface of the steering neck. The lower bearing cup tab extends upwardly from the lower bearing cup. The lower bearing cup tab engages the steering neck at a lower end of the steering neck.

The upper bearing cup further comprises an upper riser extension extending above an upper bearing race seat engagement surface formed on an upper adapter portion. The upper riser extension extends beyond the steering neck. The upper riser extension includes an external high side and an external low side. The upper riser extension has an upper cup cylindrical outer surface.

The external high side meets the external low side at a profile transition step. The profile transition step has a step corner. The step corner engages the steering neck. The upper bearing cup internal tab has a tab right side, a tab left side and a tab lower tip. The tab right side and the tab left side are configured to engage a neck upper internal indent. The lower bearing cup tab has a tab right side, a tab left side and a tab upper tip. The tab right side and the tab left side are configured to engage a neck lower internal indent.

The lower bearing cup tab is a right lower bearing cup external tab mounted on a right side of a lower riser extension. The lower riser extension extends downwardly from a lower adapter portion of the lower bearing cup. A left lower bearing cup external tab is mounted on the left side of the lower riser extension. The lower riser extension further includes a steering stop lower engagement surface between the left lower bearing cup external tab and the right lower bearing cup external tab. The steering stop lower engagement surface is configured to engage a steering stop formed on the steering neck. The left lower bearing cup external tab and the right lower bearing cup external tab both extend upwardly and cooperate to resist rotation in the second mode.

The left lower bearing cup external tab and the right lower bearing cup external tab both have a bevel defining an intersection between a lower bearing race seat vertical engagement surface and an outside engagement surface. The outside engagement surface of the left lower bearing cup external tab and the outside engagement surface of the right lower bearing cup external tab are facing each other. The left lower bearing cup external tab and the right lower bearing cup external tab both have an external tab overhang. The upper bearing cup has an integral upper bearing race that receives the upper bearing in the second mode. The lower bearing cup optionally has an integral lower bearing race. The integral lower bearing race receives the lower bearing in the second mode.

The present invention is a retrofit motorcycle fork adapter for an existing motorcycle steering neck having a fixed neck rake. The motorcycle fork adapter modifies the rake primarily by inserting bearing race adapters into the existing bearing races. The retrofit bearing race adapters use the existing bearing race, and existing flats on the neck which were not intended by the original manufacturer of the frame for a bearing race cup to provide a mount for special bearing races that alter the neck rake.

The present invention overcomes the prior art deficiency of having low structural rigidity while at the same time being easier to install. A key feature of the present invention is that it uses the bearing race to locate the bearing cup. It is an object of the present invention to avoid structural rigidity issues. For example, other kits use a lower neck cup like structure that offsets from the steering stem and moves the steering axis outside the steering neck. The top tree is pivoted off of the upper stem, but the stem axis is not along the steering axis. Some kits have the steering stem not passing through the lower tree. The upper and lower tree are not clamped together by the steering stem, thus leading to structural rigidity issues. It is an object of the present invention to have the steering axis and stem remain inside the original steering neck. It is a further object of the invention to use existing steering neck structure to secure the new bearing cups. It is a further object of the invention to allow modification of existing steering necks which were never intended for use with a bearing cup.

The present invention provides a retrofit mechanism for modification or adjustment of the steering head angle of the front fork of a motorcycle, bicycle or other vehicle which is not originally intended to have an adjustment that can be modified without cutting of any existing material. The present invention is the first to capitalize on these otherwise unused features to provide a means to easily adjust the steering rake of existing vehicles.

The mechanism includes a steering spindle and two bearing means arranged at locations spaced longitudinally of the spindle. The bearing means mount the spindle in a motorcycle frame for angular rotation about a generally upright axis in the central longitudinal vertical plane of the motorcycle. A coupling means connects the front fork to the spindle in a vertically fixed relation for rotation with the spindle. At least one of the bearing means has an adjustment means operable to vary the angular position of the axis in a vertical plane to vary the steering head angle of the front fork.

Figure 1:
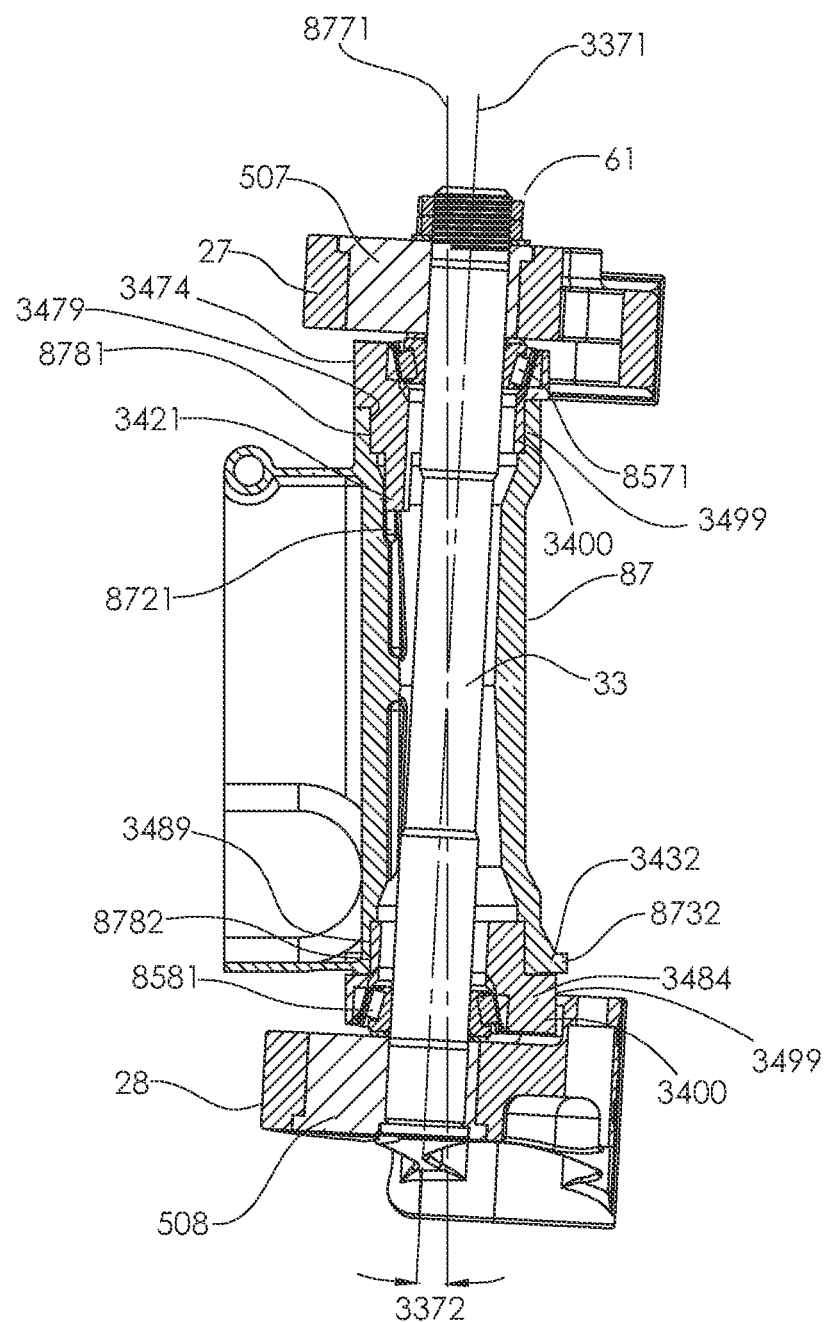
FIG. 1 is a cross section of the fork adapter.

The following call out list of elements can be a useful reference for the call out numbers in the drawings.

27 Upper Tree
28 Lower Tree
33 Steering Stem
61 Steering Stem Nut
70 Upper Riser Extension
71 External High Side
72 External Low Side
73 Profile Transition Step
74 Step Corner
75 Upper Riser Shoulder
76 Upper Bearing Race Seat Engagement Surface
77 Tab Right Side
78 Tab Left Side
79 Tab Lower Tip
80 Lower Riser Extension
81 Right Lower Bearing Cup External Tab
82 Left Lower Bearing Cup External Tab
83 Lower Riser Shoulder
84 Lower Riser Shoulder Corner
85 Steering Stop Lower Engagement Surface
86 Lower Bearing Race Seat Vertical Engagement Surface
87 Steering Neck
88 Lower Housing Race Seat Horizontal Engagement Surface
89 External Tab Overhang
90 Lower Adapter Portion
91 Upper Adapter Portion
92 Adapter Indicator
93 Thin Side
94 Thick Side
95 Lower Adapter Portion
96 Lower Tab Upper Tip
97 Bevel
98 Inside Engagement Edge
99 Outside Engagement Edge
102 Stanchion Tube
507 Upper Eccentric Pivot
508 Lower Eccentric Pivot
3371 Steering Stem Centerline
3372 Offset Angle
3400 Bearing Cup
3420 Bearing Cup Tab
3421 Upper Bearing Cup Internal Tab
3431 Lower Bearing Cup Internal Tab
3432 Lower Bearing Cup External Tabs
3470 Upper Bearing Cup
3471 Internal Upper Bearing Cup
3472 Internal Upper Bearing Cup With Race
3473 External Upper Bearing Cup
3474 External Upper Bearing Cup With Race
3479 Upper Cup External Cylindrical Outer Surface
3480 Lower Bearing Cup
3481 Internal Lower Bearing Cup
3482 Internal Lower Bearing Cup With Race
3483 External Lower Bearing Cup
3484 External Lower Bearing Cup With Race
3489 Lower Cup External Cylindrical Outer Surface
3499 Bearing Cup Cylindrical Outer Surface
8500 Bearing
8571 Upper Bearing
8581 Lower Bearing
8670 Bearing Races
8671 Upper Bearing Race
8672 Integrated Upper Bearing Race
8681 Lower Bearing Race
8682 Integrated Lower Bearing Race
8720 Neck Internal Flats
8721 Neck Upper Internal Flat Indent
8731 Neck Lower Internal Flat
8732 Neck Lower External Flat Protrusion
8742 Steering Stop
8771 Steering Neck Centerline 8780 Neck Bearing Race Seat
8781 Neck Upper Bearing Race Seat
8782 Neck Lower Bearing Race Seat

DETAILED DESCRIPTION OF THE PREFERRED EMBODIMENT

The present invention works on both common types of motorcycle steering neck structures which include the type that uses modular bearing cups on the frame neck tube as well as the type that have steering necks with built in bearing race seats. While many frames are designed to have these pressed in steering cups many other motorcycles have the receptacle for the bearing races built in to the steering neck 87. The present invention is installed to an existing frame steering neck's 87 bearing race seats 8780 to install a specially designed and unique raked bearing cup 3400 so as to easily facilitate the altering of the existing frames rake angle. Thus, the present invention can work on any type of motorcycle steering neck structure that has a removable bearing. The replacement bearing cup 3400 has a receptacle to mount a bearing. A cylindrical outer surface 3499 is configured to fit the neck bearing race seat 8780, thus allowing the bearing cup 3400 to be installed on a steering neck 87, even if the steering neck was never intended to use a bearing cup 3400.

The present invention has a first mode of operation which is the original configuration of the stock motorcycle, and a second mode of operation which is the modified angle. The user can switch between the first mode and the second mode of operation by reconfiguring the parts.

Typical production vehicles have flat grooves on the steering neck. These flat grooves or protrusions can be external or in some cases internal. These flat grooves or protrusions were intended either as provisions steering stops, or key grooves for removing bearing races, or for intermediate manufacturing steps. A key feature of the present invention is that these otherwise unused features to provide a structure for securing rake adapter bearing cups which allows easy retrofit modification of the steering rake of existing vehicles while retaining safety and security.

As seen in FIG. 1, a bearing cup 3400 is used in the upper and lower ends of the steering neck 87. A motorcycle fork adapter modifies the rake of a steering neck 87 from a steering neck centerline 8771 to a steering stem centerline 3371 to produce a modification angle that is the offset angle 3372. The upper tree 27 has an upper eccentric pivot 507 which attaches to the steering stem 33 and is secured by a steering stem nut 61. The present invention is a mechanism for retrofitting and adjusting the steering head angle of the front fork of a motorcycle, bicycle or other vehicle with a fixed rake angle.

The bearing cups 3400 include the upper bearing cup 3470 and the lower bearing cup, which in some cases can be interchangeable. The bearing cups 3400 have an upper cup external cylindrical outer surface 3479 and a lower cup external cylindrical outer surface 3489. A key feature of this invention is that the upper bearing cup 3407 fits into the neck upper bearing race seat 8781 of an existing steering neck 87 after the previous upper bearing race 8671 has been removed from the neck upper bearing race seat 8781 of the steering neck 87. Similarly the lower bearing cup 3408 has a lower cup external cylindrical outer surface 3489 that fits into the neck lower bearing race seat 8782 of the existing steering neck 87 after the previous lower bearing race 8681 has been removed from the neck lower bearing race seat 8782 of the steering neck 87. The existing bearing race and bearing are then reinstalled on the adapter cups formed as the bearing cups 3400.

The bearing cup 3400 is configured to receive a bearing 8500 which is formed as the upper bearing 8571 or lower bearing 8581 depending upon respective engagement with the upper bearing cup 3470 or the lower bearing cup 3480. The bearing cups may be further categorized based on whether they use an integral or pressed in bearing race. Another distinction is whether the indexing tab is external, internal or both. Thus, the bearing cups 3400 have a few variations.

Some bearing cups 3400 have a bearing cup tab 3420 which index the neck internal flat indents 8720. The bearing cup tabs 3420 allow the cups to be pressed in to the bearing race seats 8780 of the steering neck 87 in the correct orientation. The bearing cup tabs 3420 resist rotation of the bearing cups 3400 during use by abutting inside surfaces of the indents. Even a small misalignment will significantly degrade the motorcycles handling characteristics, so the bearing cup tabs are configured to fit snugly.

The upper bearing cup internal tab 3421 and the lower bearing cup internal tab 3431 both engage the neck internal flat indents 8720 and have a similar shape. External tabs, such as the lower bearing cup external tabs 3432 engage a steering stop of the fork.

The parts are concentrically aligned except for the steering neck. Only the lower bearing cup 3483 is offset from the upper bearing cup 3473 to provide an angle between the steering stem and the neck or offset angle 3372. The cups may protrude externally from the steering neck 87. The cups may also be mounted within the neck when a smaller steering stem 33 is used. This hides the neck rake alteration from a casual observer.

In some cases, it may be beneficial to incorporate the bearing races 3681, 8671 into their respective cups, with an upper bearing cup with race 3473 and lower bearing cup with race 3484. The bearing cup 3470 has specific pads which are specific to the make, model and year of the motorcycle that the cup is intended to retrofit. These pads may register on the internal bore of the steering neck 87.

The upper bearing 8571 is mounted to the upper bearing race, which formed in the external upper bearing cup with race 3474, which in turn is mounted to the steering neck 87 at the neck upper bearing race seat 8781. The upper cup cylindrical outer surface 3479 of the external upper bearing cup with race 3474 engages the neck upper bearing race seat 8781. The upper bearing 8571 rotates with the steering stem 33 and is rigidly connected to the upper eccentric pivot 507. The upper eccentric pivot 507 is connected to the upper tree 27. The upper bearing cup internal tab 3421 extends downwardly from the external upper bearing cup and extends into, engages and connects to the neck upper internal flat indent 8721 thereby limiting rotation of the bearing cup 3400.

Similarly, the lower bearing 8581 is also mounted to a bearing cup 3400 formed as an external lower bearing cup with race 3584. The external lower bearing cup with race 3484 has a lower cup external cylindrical outer surface 3489 that engages a neck lower bearing race seat 8782. The external lower bearing cup with race 3484 has tabs such as the lower bearing cup external tabs 3432 that engage the neck lower external flat protrusion 8732 which is often formed as a steering stop. The tabs prevent rotation of the external lower bearing cup with race 3484. The lower eccentric pivot 508 is rigidly connected to the steering stem 33 and mounted to the lower tree 28 to provide an offset angle 3372.

Figure 2:
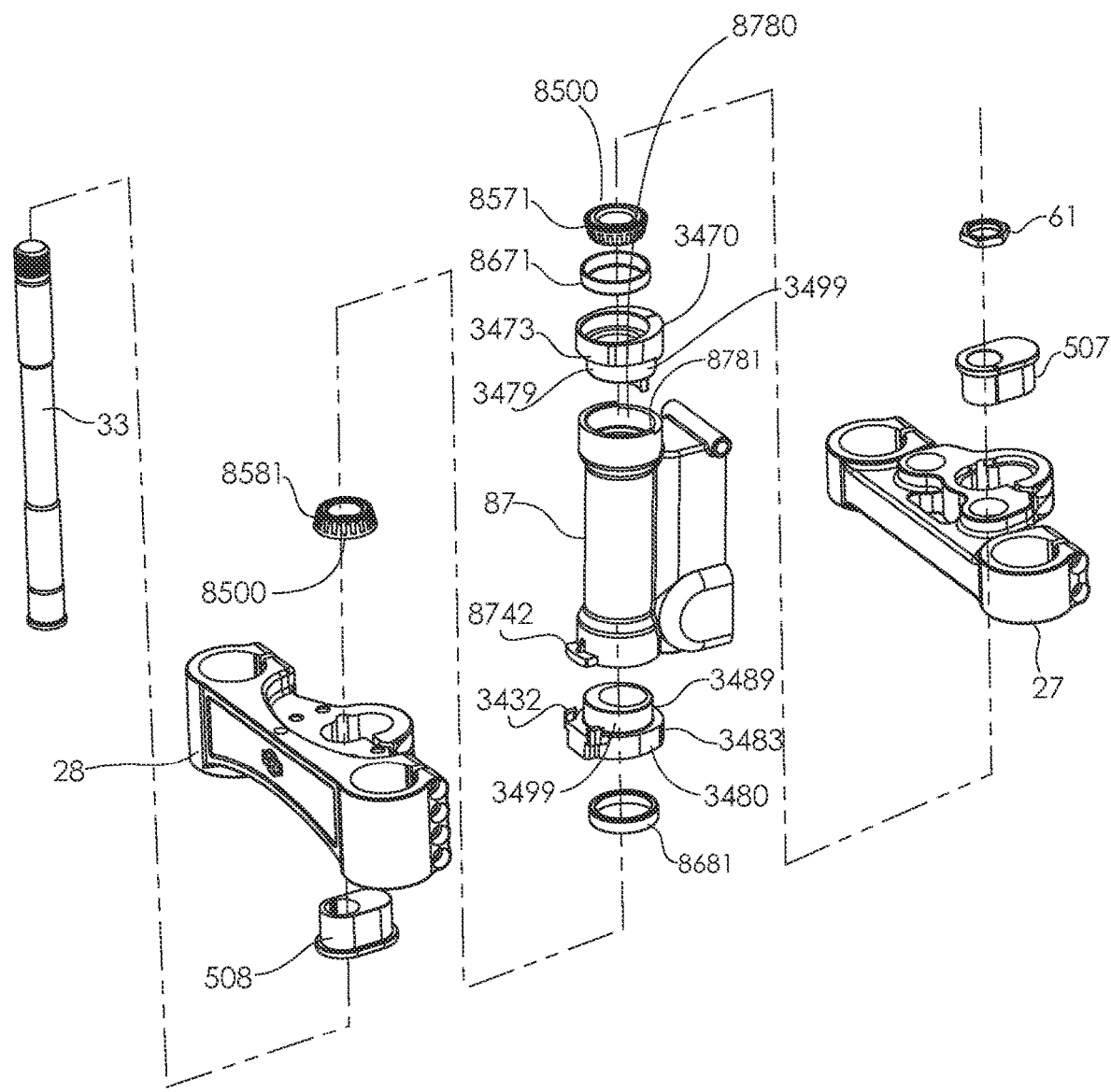
FIG. 2 is an exploded view of the fork adapter

As seen in FIG. 2, a perspective exploded view of the present invention shows the assembly of an embodiment similar to the one shown in FIG. 1. The upper tree 27 is mounted over the lower tree 28. The upper tree 27 receives an upper eccentric pivot 507 held by a steering stem nut 61. The upper eccentric pivot 507 is secured to the steering stem 33. The lower tree 28 has a lower eccentric pivot 508 that secures to the steering stem 33.

The steering neck 87 is formed as a tubular cylinder having a frame attached to it. The steering neck 87 receives an external upper bearing cup 3473 which receives the upper bearing race 8671 which receives the upper bearing 8571.

Similarly, the steering neck 87 receives an external lower bearing cup 3583 which receives a lower bearing race 8681. The external lower bearing cup 3583 has a pair of lower bearing cup external tabs 3432 which include a right lower bearing cup external tab 81 and a left lower bearing cup external tab 82 that engage a steering stop 8742 formed on the steering neck 87. A bearing 8500 formed as a lower bearing 8581 can be mounted to a lower bearing race 8681 which in turn is mounted to a bearing cup 3400 formed as an external lower bearing cup 3483 which has a lower cup cylindrical outer surface 3489 engaging the steering neck 87.

Figure 3:
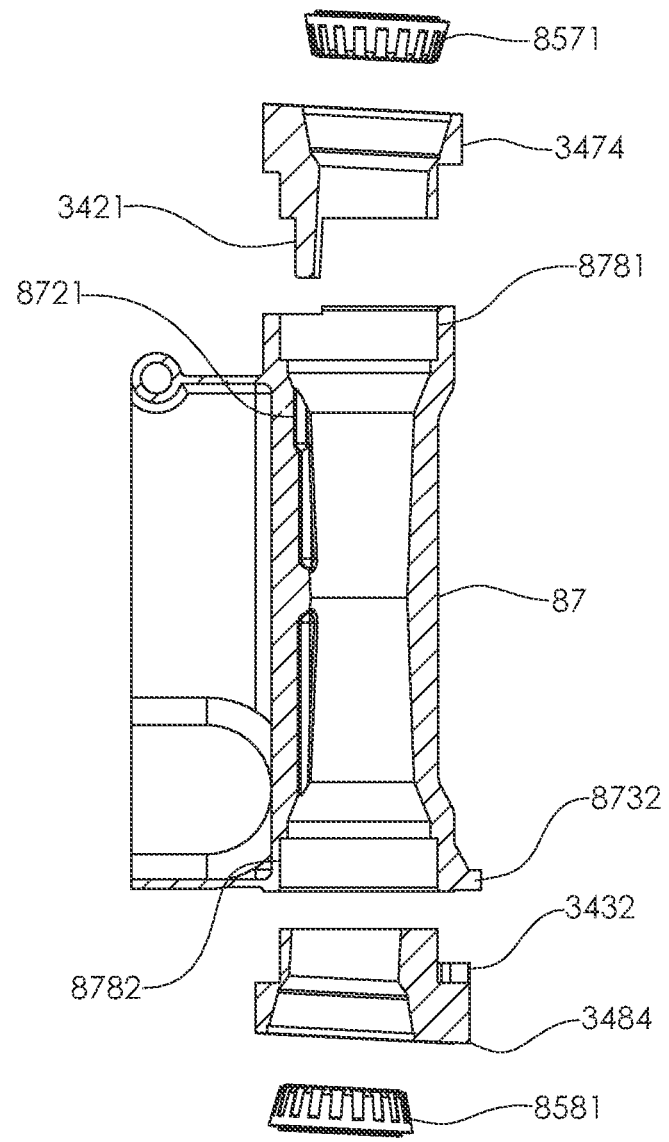
FIG. 3 is an exploded cross section view of the fork adapter.

As seen in FIG. 3, the bearing cups 3400 can be formed as an external upper bearing cup with race 3474 which receives an upper bearing 8571 at the neck upper bearing race seat 8781. The external upper bearing cup with race 3474 has a downwardly extending upper bearing cup internal tab 3421 which engages a neck upper internal flat indent 8721 on the steering neck 87. Similarly, the lower bearing cup can be formed as an external bearing cup with rake 3484 which receives a lower bearing 8581 and fits to the neck lower bearing race seat 8782. The lower bearing cup external tabs 3432 can engage the neck lower external flat protrusion 8732 which could be formed as a steering stop.

Figure 4:
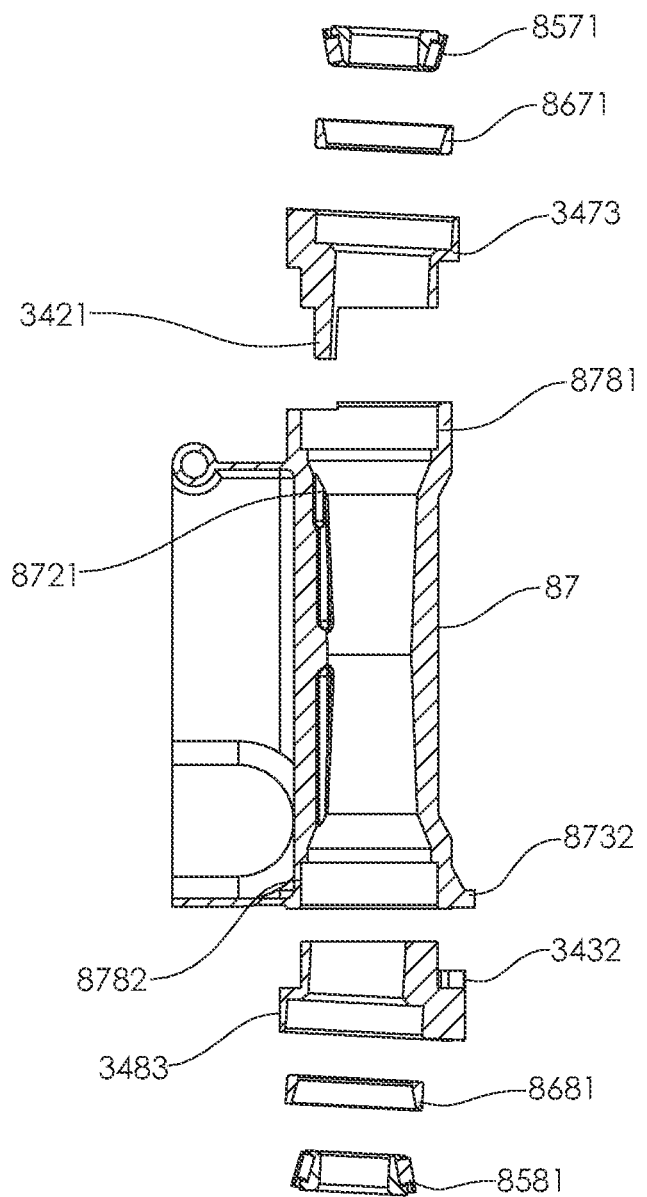
FIG. 4 is an exploded cross section view of the fork adapter.

As seen in FIG. 4, the bearing cups 3400 can be formed as an external upper bearing cup 3473 and an external lower bearing cup 3483. The external upper bearing cup 3473 receives the upper bearing race 8671 which receives the upper bearing 8571. The external upper bearing cup 3473 has an upper bearing cup internal tab 3421 that engages the neck upper internal flat indent 8721. The external upper bearing cup 3473 mounts to the steering neck 87 at the neck upper bearing race seat 8781.

Similarly, the external lower bearing cup 3483 receives a lower bearing race 8681 which receives a lower bearing 8581. The lower bearing cup has lower bearing cup external tabs 3432 which engage a neck lower flat protrusion 8732. The lower bearing cup engages the neck lower bearing race seat 8782.

Figure 5:
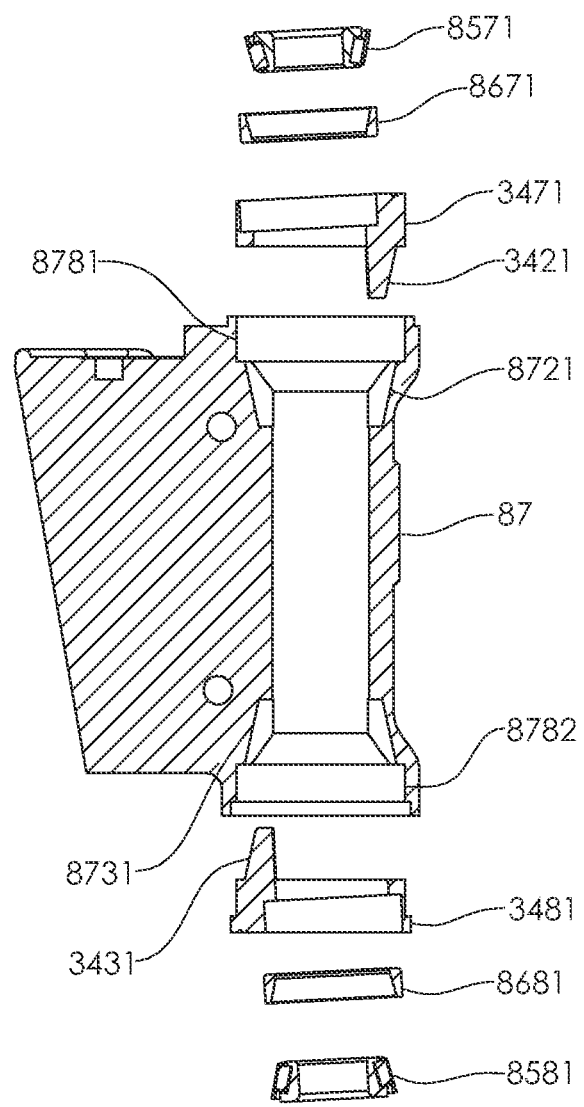
FIG. 5 is an exploded cross section view of the fork adapter.

As seen in FIG. 5, the bearing cups 3400 can be formed symmetrically for engaging symmetrical steering necks 87. An internal upper bearing cup 3471 can engage a neck upper bearing race seat 8781. The neck upper internal flat indent 8721 can receive the upper bearing cup internal tab 3421 of the internal upper bearing cup 3471. The upper bearing 8571 is reinserted into the upper bearing race 8671 which is inserted into the internal upper bearing cup 3471. The lower bearing cup has a lower bearing cup internal tab 3431 which engages the neck lower internal flat indent 8731 to prevent rotation of the internal lower bearing cup 3481. The internal lower bearing cup 3481 receives the lower bearing race 8681 which in turn receives the lower bearing 8581.

Figure 6:
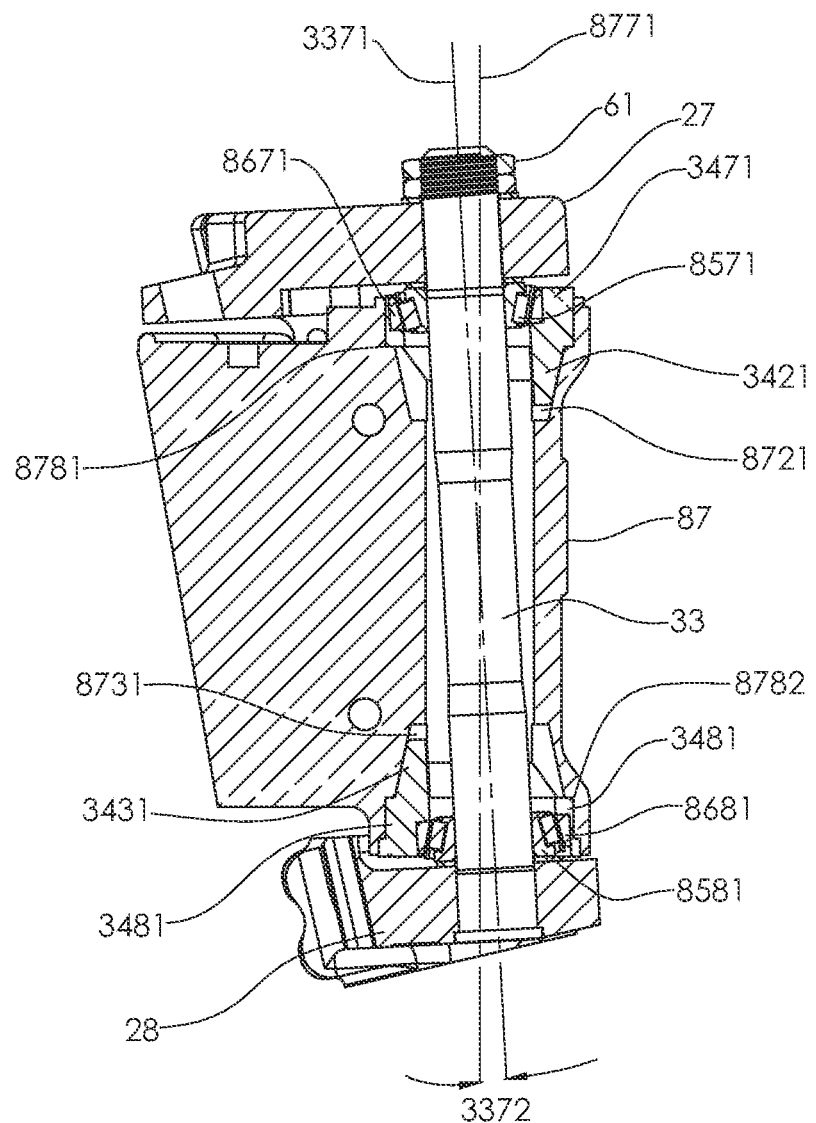
FIG. 6 is a cross section of the fork adapter.

As seen in FIG. 6, the bearing cups 3400 can be formed symmetrically and mounted so that the lower bearing cup internal tab 3431 seats into the neck or internal flat indent 8731 so that a top tip of the lower bearing cup internal tab 3431 almost bottoms out to touch the end of the neck lower internal flat indent 8731 to leave a small gap. The internal lower bearing cup 3481 does not protrude substantially beyond the steering neck 87 which maintains the original look of the motorcycle but with an offset angle 3372 of the lower tree 28 and the upper tree 27. The steering stem 33 has a steering stem centerline 3371 which is now offset from the steering neck centerline 8771. Similarly, the internal other bearing cup 3471 does not protrude substantially above the steering neck 87. The neck upper flat internal indent 8721 if symmetrical to the neck lower internal flat indent 8731 may allow the lower bearing cup internal tab 3431 to be symmetrical to the upper bearing cup internal tab 3421 which would allow the internal upper bearing cup 3471 to be the same as the internal lower bearing cup 3481.

Figure 7:
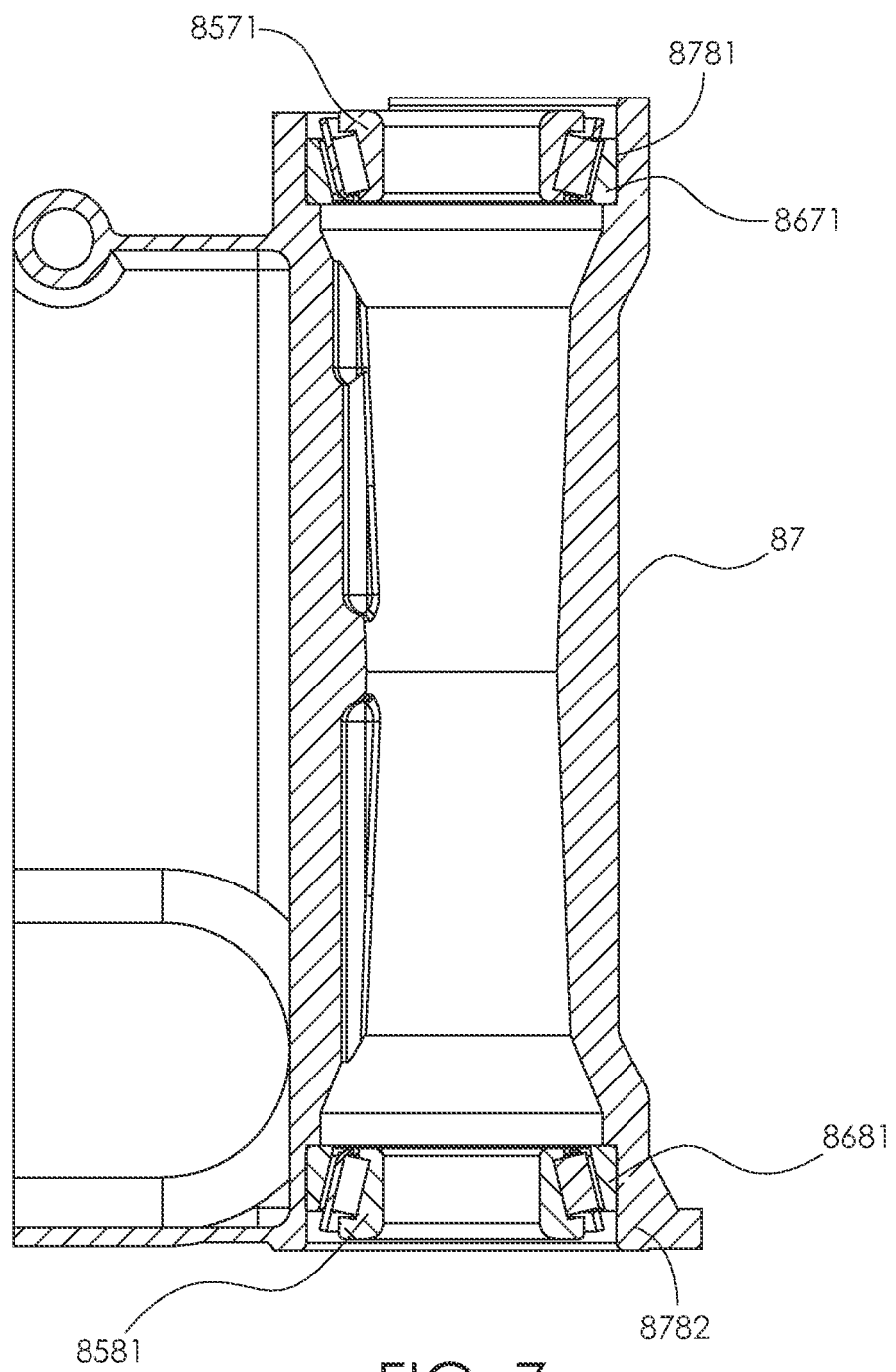
FIG. 7 is a cross section of the fork adapter.
Figure 8:
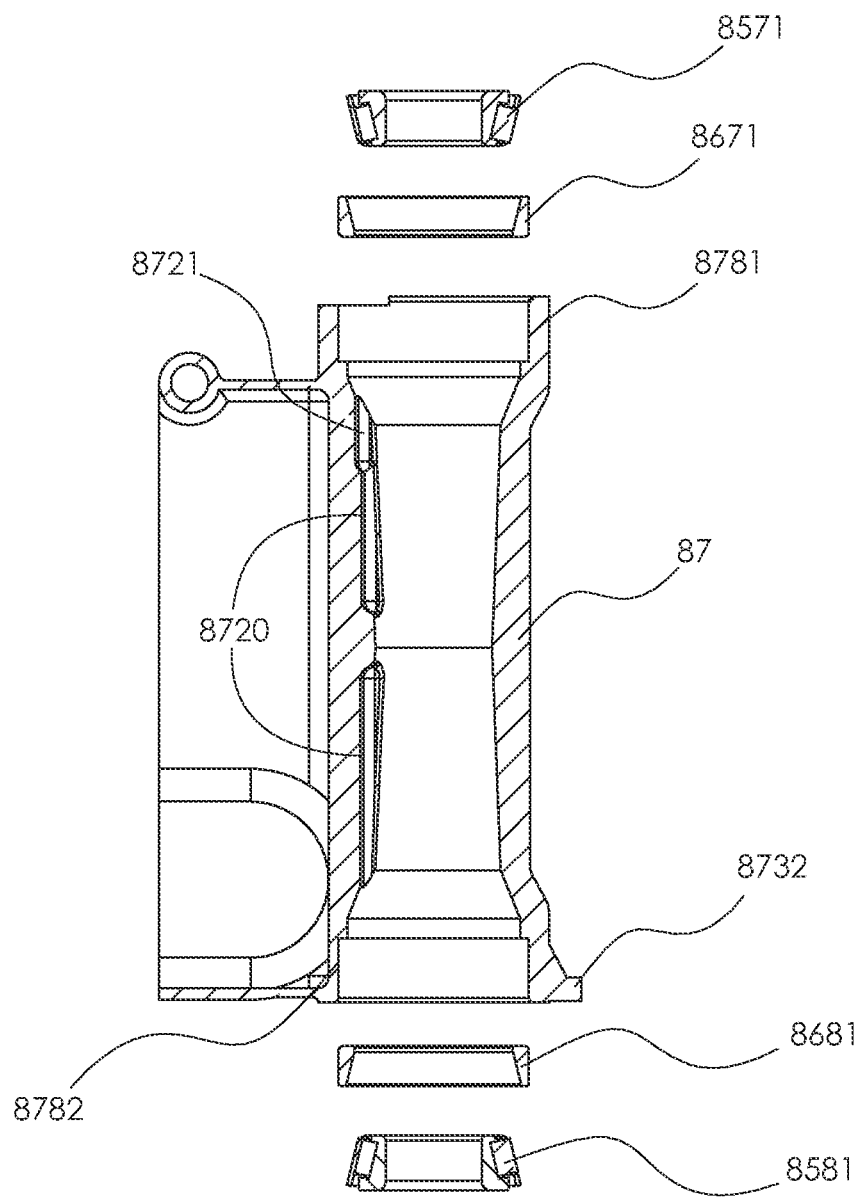
FIG. 8 is a cross section of the fork adapter.

As seen in FIG. 7, the steering neck 87 original configuration has an upper bearing race 8671 and upper bearing 8571 that fits into the original neck upper bearing race seat 8781. The original configuration also has the neck lower bearing race seat 8782 receiving the lower bearing race 8681 which receives the lower bearing 8581. As seen in FIG. 8, the exploded view shows disassembly of the original configuration where the upper bearing 8571 is removed from the upper bearing race 8671, which is removed from the neck upper bearing race seat 8781 of the steering neck 87. Similarly, the lower bearing 8581 is removed from the lower bearing race 8681 which is removed from the neck lower bearing race seat 8782 of the steering neck 87. The disassembly process precedes the reassembly process.

Figure 9:
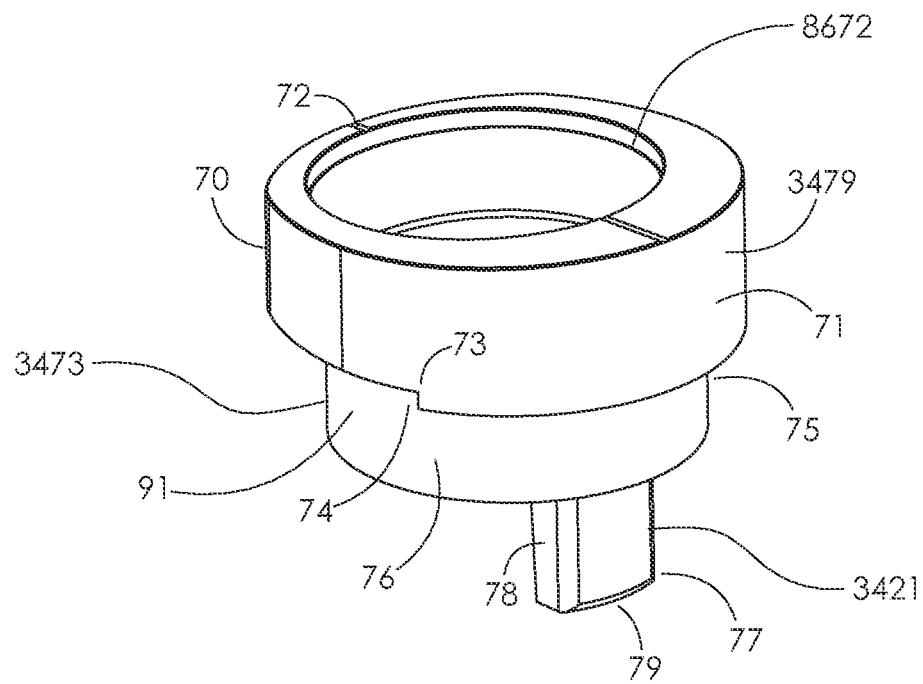
FIG. 9 is a detailed view of the upper bearing cup.

As seen in FIG. 9, the external upper bearing cup 3473 has an upper riser extension 70 which rises externally from the steering neck 87. The upper riser extension 70 has an upper cup cylindrical outer surface 3479 which has an external highside 71 and an external low side 72. The integrated upper bearing race 8672 is formed between the external highside 71 and the external low side 72. The upper riser extension 70 further includes a profile transition step 73 between the external highside 71 and the external low side 72. The profile transition step 73 has a step corner 74. The upper bearing race seat engagement surface 76 of the upper adapter portion 91 engages the original upper bearing race seat and would be larger diameter than the opening of the integrated upper bearing race 8672. The upper riser shoulder 75 defines a transition between the upper riser extension 70 and the upper adapter portion 91 which has a smaller diameter than the upper riser extension 70. An upper bearing cup internal tab extends downwardly from the upper adapter portion 91 and has a tab right side 77, a tab left side 78, and a tab lower tip 79. The edges between the tab sides can be beveled. The tab right side 77 and the tab left side 78 are configured to engage an internal vertical the oriented groove or slot in the steering neck 87. The upper riser extension 70 extends beyond the steering neck 87, while the upper adapter portion 91 remains within the steering neck 87.

Figure 10:
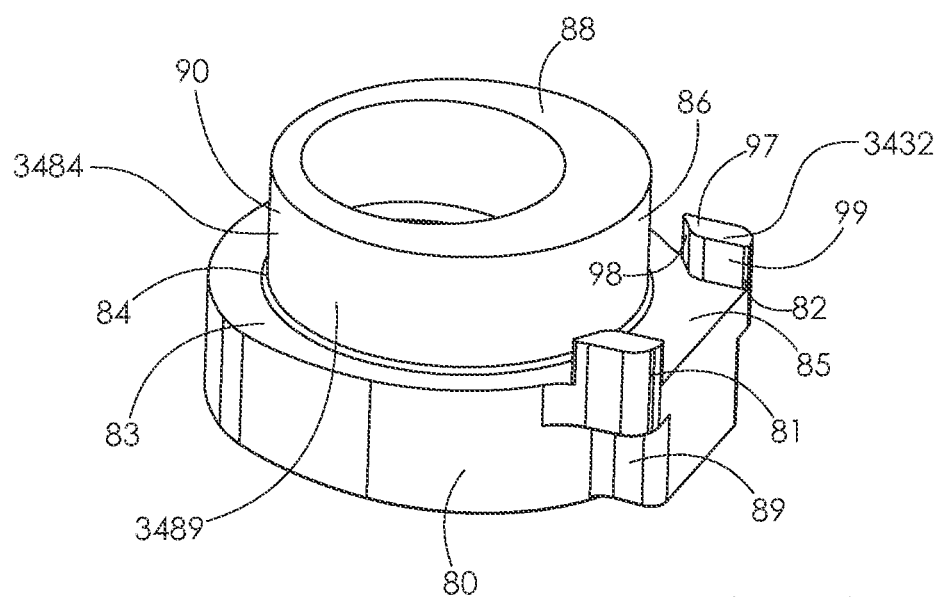
FIG. 10 is a detailed view of the lower bearing cup.

As seen in FIG. 10, the external lower bearing cup with race 3484 has a lower adapter portion 90 having a smaller diameter than a lower riser extension 80. The lower adapter portion 90 has a lower housing race seat horizontal engagement surface 88 and a lower bearing race seat vertical engagement surface 86. Engagement to the lower housing race seat horizontal engagement surface 88 is optional, however the lower bearing race seat vertical engagement surface 86 is critical. The lower riser extension 80 extends beyond the steering neck 87, while the lower adapter portion 90 remains within the steering neck 87. The external lower bearing cup with race 3484 has a lower cup cylindrical outer surface 3489 which engages the original neck lower bearing race seat 8782.

To prevent rotation, the lower riser extension 80 has a pair of external tabs formed as lower bearing cup external tabs 3432 which include a right lower bearing cup external tab 81 and a left lower bearing cup external tab 82. Each of the external tabs includes a bevel defining a transition between an inside engagement edge 98 and an outside engagement edge 99. The outside engagement edge 99 of the right tab and the outside engagement edge of the left tab engage the steering stop. Additionally, a steering stop lower engagement surface 85 of the lower riser extension 80 engages a lower surface of the steering stop. The inside engagement edge 98 of the right tab and the inside engagement edge of the left tab may engage the body of the steering neck 87 on an external surface of the steering neck so as to further stabilize the lower riser extension 80.

Figure 11:
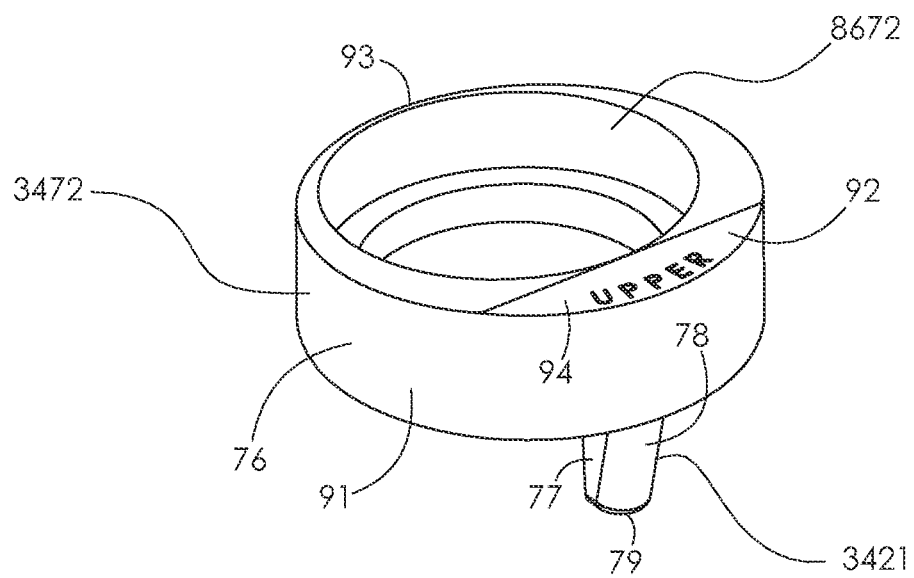
FIG. 11 is a detailed view of a bearing cup.

As seen in FIG. 11, the integrated upper bearing race 8672 is built into the internal upper bearing cup with race 3472. The upper bearing cup has an adapter indicator 92 on a thicker side 94 opposite a thinner side 93. The upper adapter portion 91 has a upper bearing cup internal tab 3421 extending downwardly from a lower surface of the upper adapter portion 91. The upper bearing cup internal tab 3421 has a tab lower tip 79 that may or may not engage an internal groove of the steering neck 87. The upper bearing cup internal tab 3421 has a tab left side 78 and a tab right side 77. The tab has an elongated finger shape and is preferably integrally formed with the upper adapter portion 91 such as by milling from a computer numerically controlled machine from billet.

Figure 12:
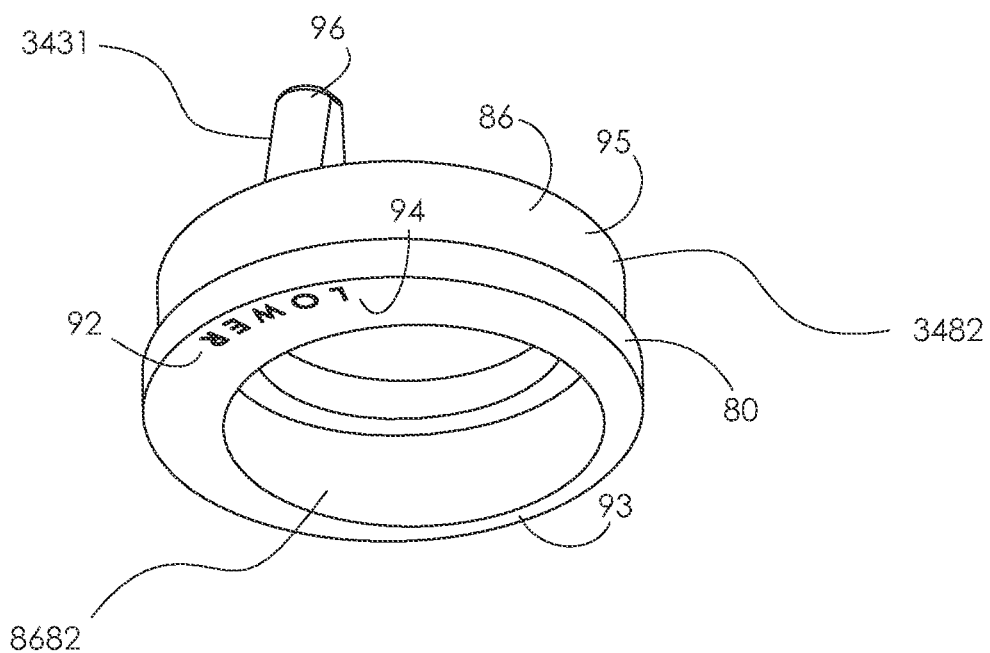
FIG. 12 is a detailed view of a bearing cup.

As seen in FIG. 12, the internal lower bearing cup with race 3482 has an integrated lower bearing race 8682. The thin side 93 is opposite the thick side 94 and the thick side has an adapter indicator 92 imprinted on it. The lower bearing race seat engagement surface 86 is formed on the lower adapter portion 95 of the internal lower bearing cup with race 3482. The lower riser extension 80 extends upwardly from the lower adapter portion 95 and has a larger diameter than the lower adapter portion 95. The lower riser extension extends beyond the steering neck 87, but only slightly because a height of the lower riser extension 80 is less than half a height of the lower adapter portion 95. The lower adapter portion 95 has an upper surface with an upwardly extending lower bearing cup internal tab is that is configured with a lower tab upper tip 96 that inserts into a slot in the steering neck 87 thereby preventing rotation. The tab has an elongated finger shape.

The invention claimed is:

1. A motorcycle fork comprising: a. an upper tree; b. a lower tree; c. a steering neck; d. a steering stem, wherein the steering stem is connected to the upper tree at a steering stem upper end, connected to the lower tree at a steering stem lower end, and passing through the steering neck, wherein the steering stem is oriented to a steering neck centerline in a first mode; e. a neck upper bearing race seat formed on an upper portion of the steering neck; f. a neck lower bearing race seat formed on a lower portion of the steering neck; g. an upper bearing race receiving an upper bearing, wherein the upper bearing race is mounted in the neck upper bearing race seat in the first mode; h. a lower bearing race receiving a lower bearing, wherein the lower bearing race is mounted in the neck lower bearing race seat in the first mode; i. an upper bearing cup, wherein the upper bearing cup is mounted in the neck upper bearing race seat in a second mode, wherein the upper bearing is mounted to the bearing cup in the second mode; j. a lower bearing cup, wherein the lower bearing cup is mounted in the neck lower bearing race seat in a second mode, wherein the steering stem has a steering stem centerline offset in a second mode that is at an offset angle from the steering neck centerline of the first mode; k. an upper bearing cup internal tab, wherein the upper bearing cup internal tab extends downwardly from the upper bearing cup, wherein the upper bearing cup internal tab is configured to engage a neck upper internal indent formed on an inside surface of the steering neck; and l. a lower bearing cup tab, wherein the lower bearing cup tab extends upwardly from the lower bearing cup, wherein the lower bearing cup tab engages the steering neck at a lower end of the steering neck.

2. The motorcycle fork of claim 1, wherein the upper bearing cup further comprises an upper riser extension extending above an upper bearing race seat engagement surface formed on an upper adapter portion, wherein the upper riser extension extends beyond the steering neck, wherein the upper riser extension includes an external high side and an external low side, wherein the upper riser extension has an upper cup cylindrical outer surface.

3. The motorcycle fork of claim 2, wherein the external high side meets the external low side at a profile transition step, wherein the profile transition step has a step corner, wherein the step corner engages the steering neck.

4. The motorcycle fork of claim 1, wherein the upper bearing cup internal tab has a tab right side, a tab left side and a tab lower tip, wherein the tab right side and the tab left side are configured to engage a neck upper internal indent.

5. The motorcycle fork of claim 1, wherein the lower bearing cup tab has a tab right side, a tab left side and a tab upper tip, wherein the tab right side and the tab left side are configured to engage a neck lower internal indent.

6. The motorcycle fork of claim 1, wherein the lower bearing cup tab is a right lower bearing cup external tab mounted on a right side of a lower riser extension, wherein the lower riser extension extends downwardly from a lower adapter portion of the lower bearing cup; and further comprising a left lower bearing cup external tab, wherein the left lower bearing cup external tab is mounted on the left side of the lower riser extension.

7. The motorcycle fork of claim 6, wherein the lower riser extension further includes a steering stop lower engagement surface between the left lower bearing cup external tab and the right lower bearing cup external tab, wherein the steering stop lower engagement surface is configured to engage a steering stop formed on the steering neck, wherein the left lower bearing cup external tab and the right lower bearing cup external tab both extend upwardly and cooperate to resist rotation in the second mode.

8. The motorcycle fork of claim 7, wherein the left lower bearing cup external tab and the right lower bearing cup external tab both have a bevel defining an intersection between a lower bearing race seat vertical engagement surface and an outside engagement surface, wherein the outside engagement surface of the left lower bearing cup external tab and the outside engagement surface of the right lower bearing cup external tab are facing each other.

9. The motorcycle fork of claim 8, wherein the left lower bearing cup external tab and the right lower bearing cup external tab both have an external tab overhang.

10. The motorcycle fork of claim 1, wherein the upper bearing cup has an integral upper bearing race, wherein the integral upper bearing race receives the upper bearing in the second mode, wherein the lower bearing cup has an integral lower bearing race, wherein the integral lower bearing race receives the lower bearing in the second mode.

11. The motorcycle fork of claim 10, wherein the upper bearing cup further comprises an upper riser extension extending above an upper bearing race seat engagement surface formed on an upper adapter portion, wherein the upper riser extension extends beyond the steering neck, wherein the upper riser extension includes an external high side and an external low side, wherein the upper riser extension has an upper cup cylindrical outer surface.

12. The motorcycle fork of claim 11, wherein the external high side meets the external low side at a profile transition step, wherein the profile transition step has a step corner, wherein the step corner engages the steering neck.

13. The motorcycle fork of claim 12, wherein the upper bearing cup internal tab has a tab right side, a tab left side and a tab lower tip, wherein the tab right side and the tab left side are configured to engage a neck upper internal indent.

14. The motorcycle fork of claim 13, wherein the lower bearing cup tab has a tab right side, a tab left side and a tab upper tip, wherein the tab right side and the tab left side are configured to engage a neck lower internal indent.

15. The motorcycle fork of claim 14, wherein the lower bearing cup tab is a right lower bearing cup external tab mounted on a right side of a lower riser extension, wherein the lower riser extension extends downwardly from a lower adapter portion of the lower bearing cup; and further comprising a left lower bearing cup external tab, wherein the left lower bearing cup external tab is mounted on the left side of the lower riser extension.

16. The motorcycle fork of claim 15, wherein the lower riser extension further includes a steering stop lower engagement surface between the left lower bearing cup external tab and the right lower bearing cup external tab, wherein the steering stop lower engagement surface is configured to engage a steering stop formed on the steering neck, wherein the left lower bearing cup external tab and the right lower bearing cup external tab both extend upwardly and cooperate to resist rotation in the second mode.

17. The motorcycle fork of claim 16, wherein the left lower bearing cup external tab and the right lower bearing cup external tab both have a bevel defining an intersection between a lower bearing race seat vertical engagement surface and an outside engagement surface, wherein the outside engagement surface of the left lower bearing cup external tab and the outside engagement surface of the right lower bearing cup external tab are facing each other.

18. The motorcycle fork of claim 17, wherein the left lower bearing cup external tab and the right lower bearing cup external tab both have an external tab overhang.

\* \* \* \* \*